United States Patent
Casani et al.

[15] 3,685,478
[45] Aug. 22, 1972

[54] WIND CONTROL STEERING SYSTEM FOR SAILBOATS

[72] Inventors: John R. Casani, Altadena; Edwin Pounder, Sierra Madre, both of Calif.

[73] Assignee: Transdynamics, Inc., Burbank, Calif.

[22] Filed: Aug. 19, 1970

[21] Appl. No.: 65,027

[52] U.S. Cl. .................................. 114/144, 318/588
[51] Int. Cl. ............................................ B63h 25/04
[58] Field of Search ....... 114/144; 318/588, 665, 647

[56] References Cited

UNITED STATES PATENTS 1,681,415  8/1928  Lee ....................... 114/144 R
3,517,285  6/1970  Kundler ..................... 318/588

*Primary Examiner*—Andrew H. Farrell
*Attorney*—Christie, Parker & Hale

[57] ABSTRACT

A sailboat has a wind control steering system including a windvane located on the boat and coupled to the shaft of a first potentiometer for producing a first set of electrical signals representing the direction of the apparent wind relative to the actual heading of the boat. A manually operative selector device coupled to a second potentiometer develops a second set of electrical signals representing the desired heading of the boat relative to the direction of the apparent wind, and the first and second sets of signals are fed to a closed loop feedback system that compares the signals and produces a steering signal representing the instantaneous heading error. A reversible motor coupled to the tiller controls the position of the rudder, and a feedback potentiometer produces an electrical signal proportional to the instantaneous position of the rudder relative to the actual heading of the boat. The rudder position signal is compared with the steering signal to produce an error signal for driving the motor to position the rudder so as to reduce the heading error.

14 Claims, 6 Drawing Figures

PATENTED AUG 22 1972 3,685,478
SHEET 1 OF 3
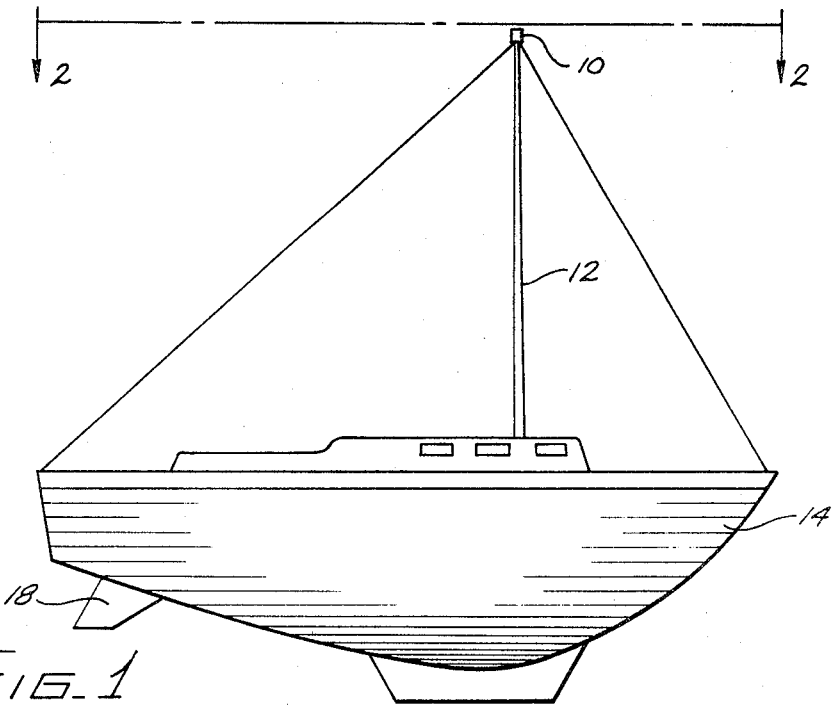
Fig_1
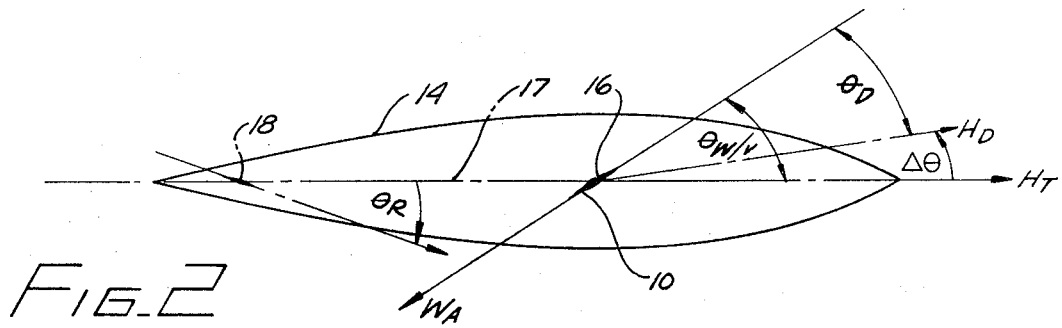
Fig_2
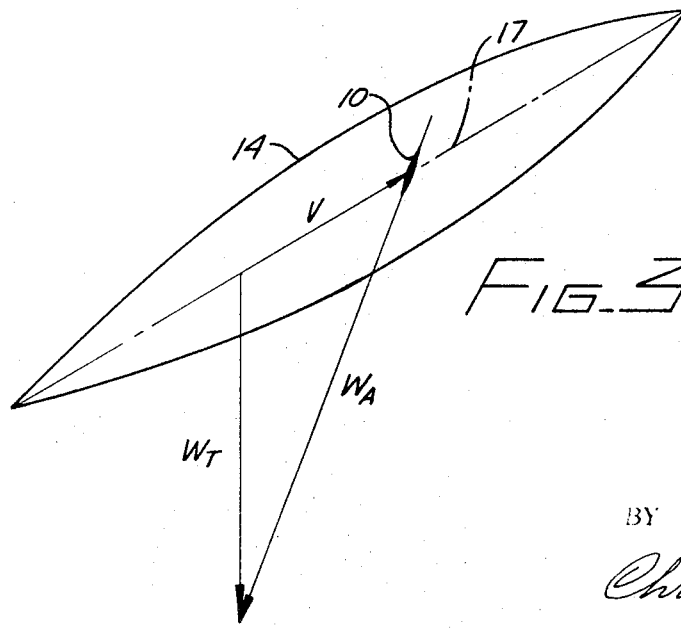
Fig_3
INVENTORS.
JOHN R. CASANI
EDWIN POUNDER
BY
Christie, Parker & Hale
ATTORNEYS

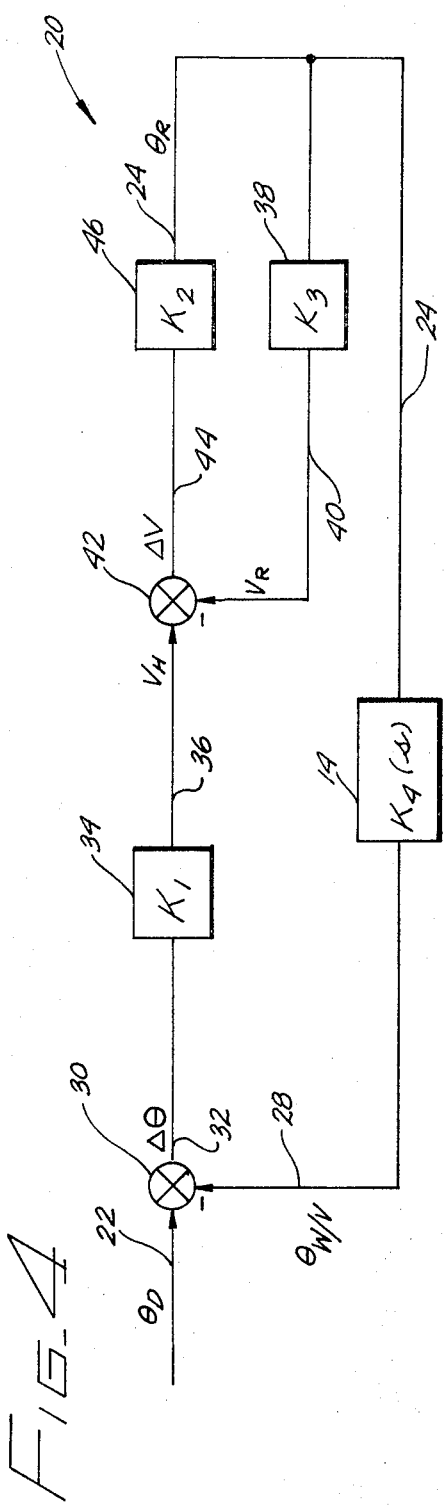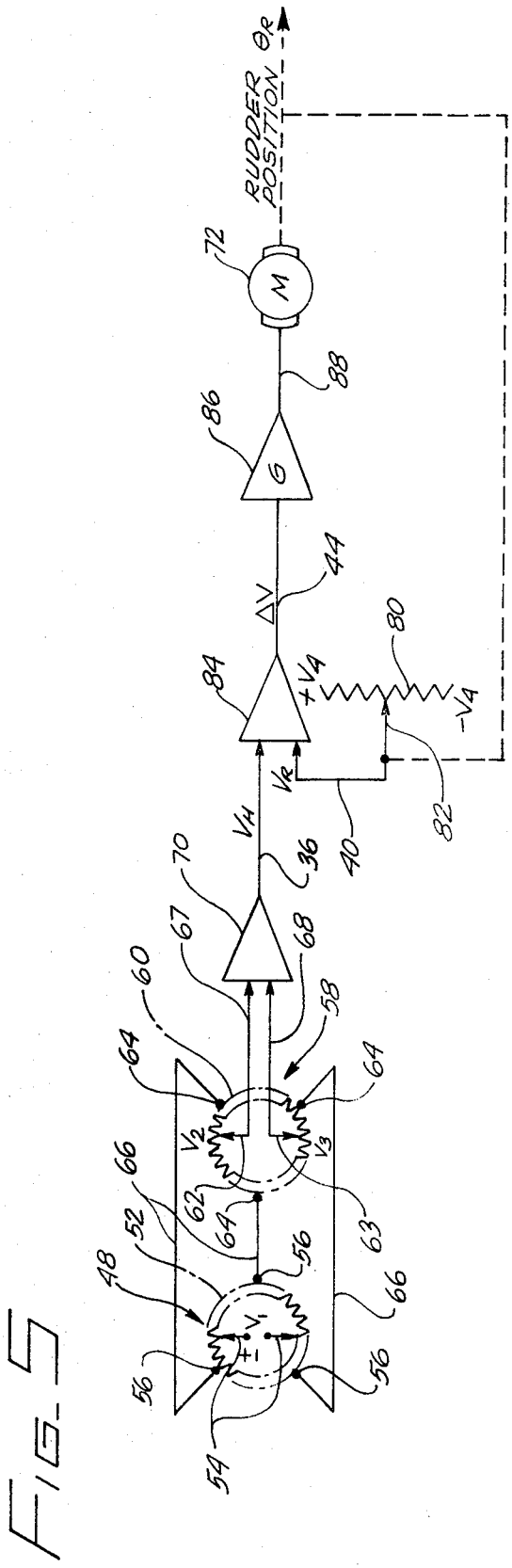
Fig. 4
Fig. 5

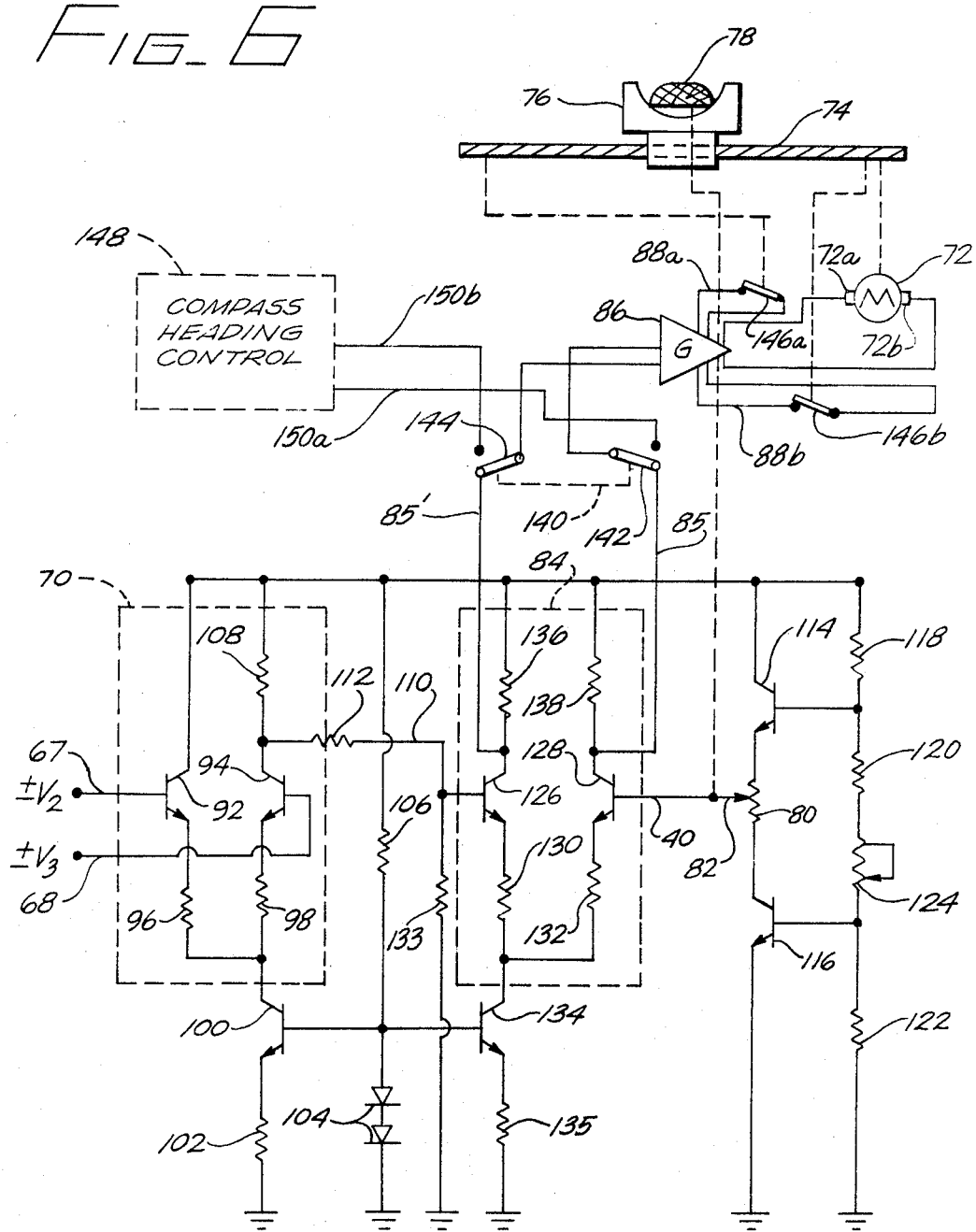

WIND CONTROL STEERING SYSTEM FOR SAILBOATS

BACKGROUND OF THE INVENTION

1. Field of the Invention

This invention relates to autopilots for sailboats, and more particularly to a system for automatically steering a boat to maintain a desired heading relative to the apparent direction of the wind.

2. Description of the Prior Art

In the past, sailboats have been equipped with autopilots for maintaining a constant course. A typical autopilot for a sailboat having a tiller-controlled rudder includes a compass for indicating the boat's deviation from the selected course, and a motor responsive to the course deviation for automatically controlling the position of the tiller to correct the heading of the boat. However, steering a sailboat on a constant course does not always produce good average speed, or good "-speed to weather" (i.e., the vector component of the boat velocity directly into the true wind). This is particularly true if the wind shifts back and forth while the boat is maintained on the constant course. Mechanical windvane systems have also been used to steer a sailboat on a constant course. These systems have not been particularly satisfactory because their response is slow and the mechanical linkages are easily fouled and corroded.

SUMMARY OF THE INVENTION

This invention is based on the recognition that the propulsive energy of the wind is used more efficiently when a sailboat is steered to maintain a constant heading relative to the apparent direction of the wind, than when the boat is steered on a constant course. As a result, the boat's average speed and speed to weather are improved.

Briefly, the invention provides a system for automatically steering a sailboat to maintain a constant heading relative to the apparent direction of the wind. The system includes a sensor for producing a signal representing the apparent direction of the wind relative to the actual heading of the boat, and a selector for producing a signal representing the desired heading of the boat relative to the apparent direction of the wind. Closed loop feedback means responsive to the sensor signal and the selector signal adjusts the position of the rudder so the boat maintains the desired heading relative to the apparent wind direction.

In the preferred form of the invention, the feedback means includes means for comparing the sensor signal and the selector signal to produce a heading error signal representing the deviation of the boat from the desired heading, and actuator means responsive to the steering signal to steer the boat. The rudder position signal is sensed and compared with the heading error signal to produce a steering signal used to prevent oversteering of the boat.

In the preferred form of the invention, the wind sensing means includes a windvane mounted on the mast and adapted to align itself with the apparent direction of the wind. Movement of the windvane produces a first electrical signal representing the direction of the apparent wind relative to the centerline of the boat. A selector device mounted on the boat is adapted to be positioned to indicate the desired heading of the boat relative to the apparent direction of the wind, and the position of the selector device is converted to a second electrical signal representing the desired heading. The feedback means includes means responsive to the first and second electrical signals for producing a steering signal that drives actuator means, such as a reversible motor coupled to the tiller or wheel for controlling the position of the rudder.

The wind control steering system of this invention is adapted to use electrical means of control for the most part, and is therefore essentially free from mechanical linkages and the like which have the disadvantages of greater weight, greater maintenance costs, an the inability to adapt to boats of different sizes. Many of the components used in connection with the steering system of this invention can be embodied in small modular units and the like, which provides the advantages of lighter weight, smaller size, and the adaptability for use with boats of different sizes.

BRIEF DESCRIPTION OF THE DRAWINGS

The above-mentioned and other aspects of the invention are more fully set forth in the following detailed description of the embodiment of the invention which is presently preferred, such description being with reference to the accompanying drawings, in which:

FIG. 1 is a side elevation of a sailboat;

FIG. 2 is a plan view taken on line 2—2 of FIG. 1 showing the angular deflection of the rudder and the windvane;

FIG. 3 is a diagram illustrating the definition of the boat velocity vector, the true wind velocity vector, and the apparent wind velocity vector;

FIG. 4 is a simplified block diagram illustrating the basic operation of the wind control steering system of this invention;

FIG. 5 is a simplified schematic circuit diagram of the apparatus of the system; and FIG. 6 is a detailed electrical circuit diagram showing the preferred system for controlling the rudder position.

DETAILED DESCRIPTION OF THE SPECIFIC EMBODIMENT

Referring to the drawings, a windvane 10 is mounted at the top of a mast 12 on a sailboat 14. The windvane rotates about a central or mast axis 16 to align itself with the direction of the apparent wind. The windvane can be located at positions on the boat other than the mast so long as it is adapted to align with the direction of the apparent wind. As shown best in FIGS. 2 and 3, the velocity vector $W_A$ of the apparent wind is the resultant of the velocity vector $W_T$ of the true wind and the velocity vector V of the boat relative to the longitudinal centerline 17 of the boat. Rotation of the windvane 10 defines an angle $\theta_{WV}$ between the direction of the apparent wind and the true heading of the boat. As shown best in FIG. 2, the true heading of the boat (represented by the arrow $H_T$) is the instantaneous direction of the boat's velocity vector V. The wind control steering system of this invention automatically steers the boat 14 so it constantly maintains a desired heading (represented by the arrow $H_D$) relative to the instantaneous direction of the apparent wind. The desired heading of the boat relative to the instantaneous direction of the apparent wind is represented by an angle $\theta_D$ between the velocity vector $W_A$ of the apparent wind and the desired heading $H_D$ of the boat. During ordinary sailing conditions, the angle $\theta_{WV}$ continuously changes, usually because of changes in the direction or speed of the true wind $W_T$ and perturbations to the boat from wave action. These changes produce an angular deviation of the boat relative to its desired heading, or heading error, measured by the angular difference $\Delta\theta$ between the angle $\theta_{WV}$ and the angle $\theta_D$. The boat 14 has a rudder 18 which during use defines an angular deflection $\theta_R$ relative to the longitudinal centerline 17 of the boat. The wind control steering system of this invention is adapted to automatically control the position of the rudder 18 so as to reduce the heading error $\Delta\theta$ so the boat continuously maintains the desired heading $H_D$.

Referring to FIG. 4, a wind control steering system 20 produces both a measurement 22 of the desired angle $\theta_D$ and a measurement 24 of the angular deflection $\theta_R$ of the rudder. Changes in the rudder angle $\theta_R$ produce corresponding changes in the angular deflection $\theta_{WV}$ of the windvane relative to boat centerline, depending upon the dynamics of the boat 14 represented by the transfer function $K_4(s)$. The magnitude of the transfer function $K_4(s)$ is dependent upon factors such as the weight and inertia of the boat, and sail trim, for example. A measurement 28 has a magnitude proportional to the angular deflection $\theta_{WV}$ of the windvane produced by changes in the wind direction, corresponding changes in the rudder position $\theta_R$, and perturbations due to wave action. Comparison means 30 produce a measurement of heating error $\Delta\theta$ having a magnitude equal to the difference between the desired angle $\theta_D$ and the windvane angle $\theta_{WV}$. The heading error is used to steer the boat to maintain the desired heading $H_D$ relative to the instantaneous direction of the apparent wind. A first amplifier 34 having a gain $K_1$ converts the heading error measurement 32 into a corresponding electrical signal or control signal 36 having a magnitude $V_H$ proportional to the magnitude of the heading error $\Delta\theta$.

A sensor 38 having a gain $K_3$ converts the rudder position 24 into a corresponding position signal 40 having a magnitude $V_R$ proportional to the magnitude of the rubber deflection $\theta_R$. Signals 36 and 40 are fed to comparison means 42 for producing an error signal or steering signal 44 having a magnitude $\Delta V$ proportional to the difference between the magnitudes $V_H$ and $V_R$ of signals 36 and 40. The magnitude $\Delta V$ and polarity of the steering signal 44 controls the angular deflection of the rudder required to turn the boat so as to reduce the heading error $\Delta\theta$.

The angular position $\theta_R$ of the rudder 18 is controlled by actuator means 46 having a gain $K_2$. The speed and direction of the rudder deflection is controlled by the amplitude and polarity of the steering signal 44 which operates actuator means 46. For a given heading error $\Delta\theta$, the wind control steering system 20 causes the rudder 18 to assume a certain offset $\theta_R$. The relative polarities of the signals 36 and 40 are arranged so the motor 46 turns the rudder in a direction that reduces the heading error $\Delta\theta$. For example, if the angle $\theta_{WV}$ becomes greater than the desired angle $\theta_D$, then a position heading error $\Delta\theta$ is produced, as shown in FIG. 2.

The resulting polarity of steering signal 44 causes the motor 46 to turn the rudder through an angle $\theta_R$ in the direction shown in FIG. 2 to reduce the heading error. The speed of the rudder movement is preferably linearly related to the magnitude of the heading error. Control system 20 is a stable closed loop system when the slewing rate of the rudder, and the ratio of $V_H$ TO $V_R$ are properly controlled. In general, there is a particular value for each of these parameters that produces the fastest boat response without oversteering, and these values are different for each boat design. Generally speaking, a fixed slewing rate is suitable for a wide range of boat designs, and those skilled in the art can establish the suitable ratio of $V_H$ to $V_R$ for each individual boat by adjusting the magnitude of the gain $K_3$.

FIG. 5 shows the preferred system for converting the physical measurement of the heading error $\Delta\theta$ to the corresponding control signal 36. The windvane 10 is mounted to the shaft of a first potentiometer 48, and the body of the potentiometer is mounted on mast 12 so the shaft is parallel to the axis of the mast, with the body of the potentiometer being fixed relative to the longitudinal centerline 17 of the boat 14. The first potentiometer 48 has a circular resistive element 52 and two electrically independent wiper arms 54 disposed 180° relative to each other. Each wiper arm 54 is adapted to rotate with the shaft of the potentiometer so as to contact any portion of the entire 360° of the resistive element 52. Three electrical taps 56 are provided on the resistive element 52 at 120° spacings.

A second or reference potentiometer 58 is contained in a module (not shown) or the like mounted at a suitable location onboard the boat. The structure of the second potentiometer is similar to that of the first potentiometer 48, and includes a circular resistive element 60, with two electrically independent wiper arms 62 and 63 disposed 180° relative to each other. A rotatable dial (not shown) mounted on the shaft of the second potentiometer rotates the wiper arms 62 and 63 together relative to the shaft so they can contact any part of the entire 360° of the resistive element 60. The position of the dial is preferably manually controlled by the operator of the boat to reflect the desired heading $H_D$ of the boat relative to the direction of the apparent wind. Three electrical taps 64 are provided on resistive element 60 at 120° spacings. A separate conductor 66 is connected between each respective tap 56 of the first potentiometer 48 and a corresponding tap 64 of the second potentiometer 58.

In use, a fixed DC potential $V_1$ is applied between the wiper arms 54 to develop a set of three potentials at the taps 56 of the first potentiometer 48. These potentials vary depending upon the position of the potentiometer shaft. Since the potentiometer shaft is driven by the windvane 10, the particular set of potentials for any given shaft position defines the instantaneous direction of the apparent wind relative to the centerline 17 of the boat. The position of the wiper arms 62 and 63 represents the desired heading of the boat relative to the direction of the wind, and the angular deviation at any time between the wiper arms 62 and 63 on the one hand and the wiper arms 54 on the other hand represents the heading error $\Delta\theta$. The set of potentials appearing at taps 56 of the first potentiometer 48 are applied to the taps 64 of reference potentiometer 58 by the respective conductors 66 to produce a potential $V_2$ at wiper arm 62 and a potential $V_3$ at the wiper arm 63. The potentials $V_2$ and $V_3$ are coupled to a first input 67 and a second input 68, respectively, of a first difference amplifier 70 for producing control signal 36 which represents the heading error $\Delta\theta$. Control signal 36 has a magnitude $V_H$ representing the voltage difference between the potentials $V_2$ and $V_3$, which is a measurement of the heading error $\Delta\theta$. Preferably, when the shafts of the two potentiometers are in the same relative position, the heading error $\Delta\theta$ is zero and the resultant voltage $V_H$ is zero. The control signal 36 is used to steer the boat to maintain the desired heading $H_D$ relative to the direction of the apparent wind.

Steering of the boat in response to control signal 36 is accomplished by a reversible DC motor 72 which controls the position of the rudder 18. As shown best in FIG. 6, the motor is coupled to an elongated lead screw 74 which turns in either a clockwise or counterclockwise direction, depending upon the direction of rotation of the output shaft (not shown) of motor 72. A yoke 76 coupled to lead screw 74 is driven lengthwise along the lead screw in a direction depending upon the direction of rotation of the lead screw. One end of a tiller 78 is set in the yoke so the tiller moves back and forth with the yoke. The opposite end of the tiller is coupled to rudder 18, and longitudinal travel of the tiller along the length of the lead screw causes a corresponding deflection $\theta_R$ of the rudder relative to the centerline of the boat. A position sensing device, preferably linear potentiometer 80, is coupled to the rudder shaft (not shown), or alternatively to the motor shaft through appropriate gearing, and a voltage $V_4$ is applied to the potentiometer 80. The wiper arm 82 of the position sensing potentiometer 80 moves in response to the angular deflection $\theta_R$ of the rudder, and contacts the potentiometer 80 to develop the position signal 40. As described above, position signal 40 has a magnitude $V_R$ representing the instantaneous position $\theta_R$ of the rudder. Control signal 36 and position signal 40 are applied to a second difference amplifier 84 which produces the steering signal 44. As described above, steering signal 44 has a magnitude $\Delta V$ representing the voltage difference between the potentials $V_H$ and $V_R$. Steering signal 44 is coupled to a power amplifier 86 having a gain G, and the output signal 88 from the power amplifier is coupled to motor 72. The speed and direction of the rudder deflection is controlled by the amplitude and polarity of the steering signal 44.

FIG. 6 shows a schematic diagram of the presently preferred circuit for producing the steering signal 44. The first difference amplifier 70 includes a first transistor 92 and a second transistor 94 having their emitter electrodes coupled through respective resistors 96 and 98. A third transistor 100 provides a high emitter impedance for the difference amplifier 70. The biasing network for transistor 100 includes a resistor 102 which couples the emitter electrode of the transistor 100 to ground, and a voltage divider network including a pair of diodes 104 and a resistor 106. The first input 67 of the first difference amplifier 70 is the base electrode of transistor 92, and the second input 68 of the first difference amplifier is the base electrode of transistor 94. The respective collector electrodes of transistors 92 and 94 are coupled to a common load resistor 108, and the output voltage signal 110 of the first difference amplifier 70 is coupled through a divider network consisting of resistor 112 and resistor 133 to the input of the second difference amplifier 84 described in detail below. The output voltage of the first difference amplifier 70 has a magnitude proportional to the difference between the magnitudes of voltage signals applied to the first and second inputs 66 and 67 of the first difference amplifier.

The rudder position sensing potentiometer 80 couples the emitter electrodes of a fourth transistor 114 and a fifth transistor 116. Resistors 118, 120, and 122, and trim pot 124 form a voltage divider network that provides the biasing for transistors 114 and 116. Movement of wiper arm 82 of the potentiometer 80 changes relative magnitude of the emitter resistance of the respective transistors 114 and 116 so as to change the magnitude and polarity of the feedback voltage signal 83 which is applied to the second difference amplifier 84, as described in detail below.

The second difference amplifier 84 includes a sixth transistor 126 and a seventh transistor 128 having their emitter electrodes coupled by respective biasing resistors 130 and 132. The output voltage signal from the first difference amplifier 70 is applied to the base electrode of transistor 126, through the divider network described above. The feedback voltage signal or position signal 40 from the linear potentiometer 80 is applied to the base electrode of transistor 128. An eighth transistor 134 provides a high emitter impedance for the second difference amplifier 84. The biasing network for the transistor 134 includes the diodes 104 and the resistor 135. The collector electrodes of transistors 126 and 128 are coupled by respective load resistors 136 and 138. The second difference amplifier 84 produces a pair of output voltage signals 85 and 85', each signal having a magnitude proportional to the difference between the magnitude of the voltage signals 110 and 40. Voltage signals 85 and 85' are equivalent to the steering signal 44.

Voltage signals 85 and 85' are applied to a double pole, double throw toggle switch 140. When switch 140 is in a first position represented by contact 142 and contact 144 is positioned as shown in FIG. 6, voltage signals 85 and 85' are applied to the power amplifier 86. For example, if voltage signal 85 has a polarity negative with respect to signal 85', representing a true heading $H_T$ to the left of the desired heading $H_D$, the amplifier 86 produces a positive voltage 88a and 88b which is applied to the poles 72a and 72b of the motor 72, thereby rotating the output shaft (not shown) of the motor in a direction that turns the lead screw 74 so as to move yoke 76 and tiller 78 farther to the left to reduce the heading error $\Delta\theta$. If the voltage signal 85 has a polarity positive with respect to signal 85', representing a true heading $H_T$ to the right of the desired heading $H_D$, the amplifier 86 produces a negative voltage 88a and 88b which is applied to poles 72a and 72b of the motor 72, thereby rotating the output shaft of the motor in a direction that turns the lead screw 74 so as to move the yoke 76 and tiller 78 farther to the right to reduce the heading error $\Delta\theta$. A first limit switch 146a is positioned adjacent to the left end of the lead screw 74, and the yoke 76 is adapted to open the switch when the yoke travels to an extreme position adjacent to the left end of the lead screw. When the switch 146a is opened, amplifier 86 is arranged to prevent further advancement of the yoke toward the left end of the lead screw. Similarly, a second limit switch 146b is positioned adjacent to the right end of the lead screw, and the yoke 76 is adapted to open the switch when the yoke travels to an extreme position adjacent to the right end of the lead screw. When switch 146b is opened, further movement of the yoke toward the right end of the lead screw is prevented.

Referring to FIG. 6, the input to amplifier 86 can be coupled to a separate steering system, such as a system for monitoring a constant compass heading of the boat. Such a system is disclosed in U.S. Pat. No. 3,237,583 to Johnson. Generally, Johnson discloses the use of a magnetic compass with a photocell pickoff on the compass card to sense heading error. The rudder position feedback function is accomplished through a mechanical linkage from the yoke and tiller to the compass gimbal.

In FIG. 6, the Johnson system is represented generally by a compass heading control system 148 which produces a pair of electrical signals 150a and 150b from the respective photocells. The magnitude and relative polarities of signals 150a and 150b represent the deviation of the boat from the desired heading. Signals 150a and 150b are coupled to amplifier 86 by moving contacts 142 and 144 of switch 140 to their other position (not shown in FIG. 6). Thus, steering control for the boat can be switched back and forth between compass steering, using a system such as that disclosed in Johnson, and wind steering, using the system of this invention. Alternatively, the mechanical linkage disclosed in Johnson can be eliminated from the compass, and the photocell output signals 150a and 150b, or output signals from another type of position sensor, such as a magnetometer, can be coupled to the inputs 67 and 68 of first difference amplifier 70.

We claim:

1. A wind control steering system for steering a boat with a rudder so the boat maintains a substantially constant heading relative to the direction of the wind, the system including wind sensing means for continuously sensing the apparent direction of the wind, the wind sensing means being mounted on the boat to move independently of rudder movement, means responsive to movement of the wind sensing means for producing a first electrical signal representing the apparent direction of the wind relative to the actual heading of the boat, course selector means to be positioned for indicating the desired heading of the boat relative to the apparent direction of the wind, means responsive to the position of the course selector means for producing a second electrical signal representing the desired heading of the boat relative to the apparent direction of the wind, and closed loop feedback means responsive to the first electrical signal and the second electrical signal for adjusting the position of the rudder so the boat maintains the desired heading relative to the apparent wind direction.

2. A system according to claim 1 wherein the closed loop feedback means includes means for sensing rudder position to prevent oversteering of the boat.

3. A system according to claim 1 wherein the closed loop feedback means includes:

a. means for producing a heading error signal representing the difference between the magnitudes of the first electrical signal and the second electrical signal;
b. sensor means for producing a signal representing the instantaneous position of the boat rudder relative to the actual heading of the boat;
c. means for producing a steering signal representing the difference between the magnitudes of the heading error signal and the rudder position signal; and
d. actuator means responsive to the steering signal and coupled to the rudder for adjusting the position of the rudder.

4. A system according to claim 1 wherein the wind sensing means includes a windvane mounted on the boat and adapted to position itself with the apparent direction of the wind, and a rotatable shaft on which the windvane is mounted, and including first electrical circuit means coupled to the shaft for producing the first electrical signal, the magnitude of said signal varying in accordance with the instantaneous position of the shaft.

5. A system according to claim 4 wherein the selector means is mounted on a shaft separate from that of the windvane, and including second electrical circuit means coupled to the selector means shaft for producing the second electrical signal, the magnitude of the second electrical signal varying in accordance with the instantaneous position of the selector means shaft.

6. A system according to claim 3 wherein the rudder position sensor means includes means responsive to the angular adjustment of the rudder for producing a first electrical signal representing the instantaneous deflection of the rudder relative to the centerline of the boat.

7. A system according to claim 6 wherein the rudder rotates about an elongated shaft, and wherein the means responsive to the angular adjustment of the rudder includes a potentiometer having a wiper arm coupled to the rudder shaft and adapted to move in response to rotation of the shaft to produce an electrical signal having a magnitude representing the angular position of the shaft centerline relative to the centerline of the boat.

8. A system according to claim 6 including a second electrical signal representing the magnitude of the heading error signal, and wherein the steering signal producing means includes comparison means for producing an electrical signal representing the difference between the magnitudes of the first and second signals.

9. A system according to claim 8 wherein the actuator means includes a reversible electric motor having an output shaft rotatable in response to the steering signal, and means for coupling the output shaft of the motor to the rudder.

10. A system according to claim 9 wherein the rudder rotates about an elongated shaft; wherein the coupling means includes a tiller for controlling the angular position of the shaft; and wherein the actuator means further includes means coupled between the output shaft of the motor and the tiller for moving the tiller in a direction corresponding to the direction of rotation of the motor.

11. A system according to claim 10 wherein the rudder position sensing means includes means for sensing the angular position of the shaft.

12. In a sailboat steered by a rudder, a wind control steering system for steering the boat so it maintains a substantially constant heading relative to the apparent direction of the wind, the system including wind sensing means movably mounted on the boat for continuously sensing apparent wind direction, the wind sensing means being mounted only for movement independent of that of the rudder, means responsive to the movement of the wind sensing means for producing a first electrical signal representing the apparent direction of the wind, course selecting means movably mounted on the boat for indicating a desired heading relative to the apparent wind direction, means responsive to movement of the course selecting means for producing a second electrical signal representing the desired heading of the boat relative to the apparent wind direction, and closed loop feedback means responsive to the first electrical signal and the second electrical signal for adjusting the rudder position to maintain the heading.

13. A system according to claim 12 including means for sensing rudder position to prevent oversteering of the boat.

14. A system according to claim 12 wherein the wind sensing means includes a windvane mounted on a first shaft adapted to rotate in response to the direction of the apparent wind, and including a first shaft angle encoder coupled to the first shaft for producing the first electrical signal; wherein the course selecting means is mounted on a rotatable second shaft separate from that of the windvane, and including a second shaft angle encoder coupled to the second shaft for producing the second electrical signal; and wherein the feedback means includes a shaft angle decoder responsive to the first and second signals for producing a heading error signal for controlling rudder position.

* * * * *